Figure 1:
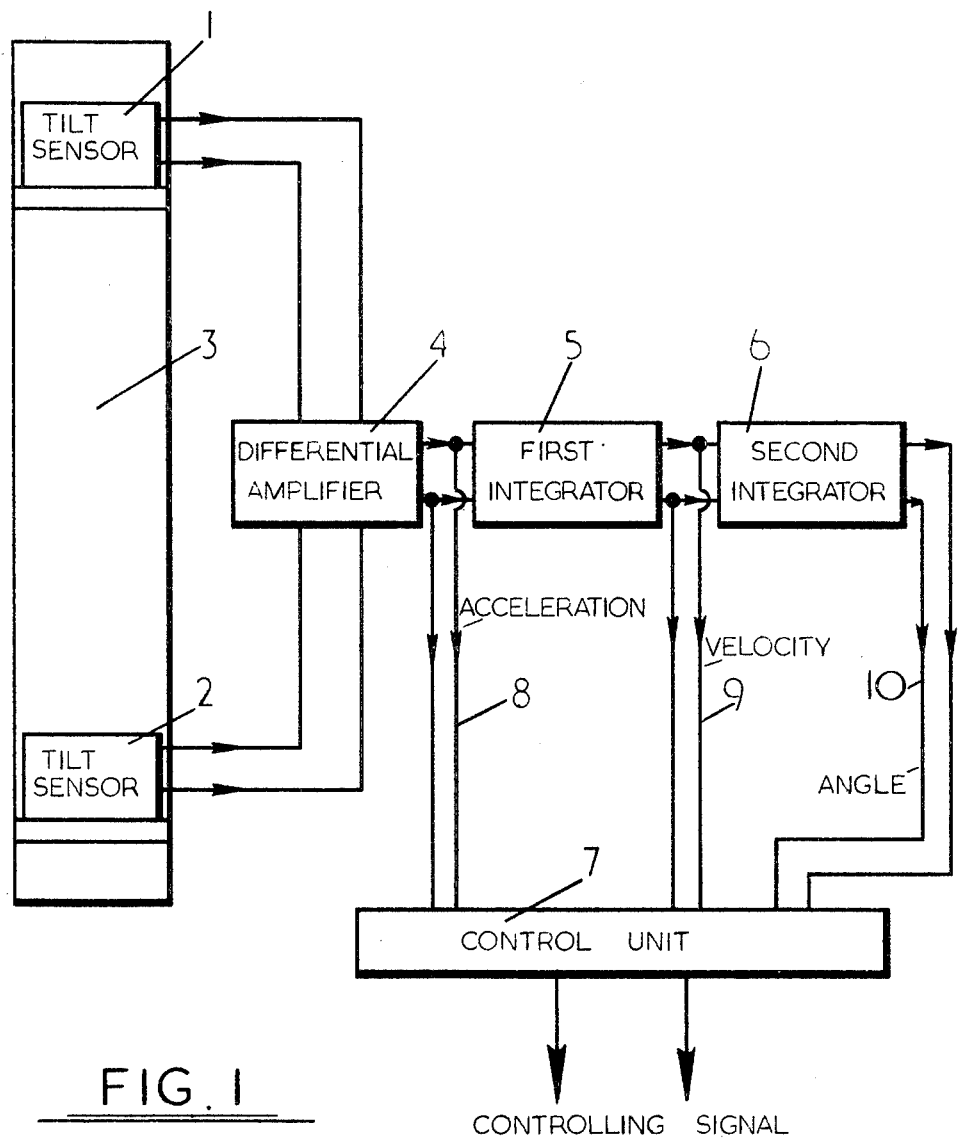

United States Patent [19]

Benington

[11] 4,095,547

[45] Jun. 20, 1978

[54] ACCELERATION MEASURING DEVICE

[75] Inventor: Charles Kenneth Benington, Edinburgh, Scotland

[73] Assignee: Brown Brothers & Company, Ltd., Edinburgh, Scotland

[21] Appl. No.: 680,929

[22] Filed: Apr. 27, 1976

[30] Foreign Application Priority Data

May 1, 1975 United Kingdom .............. 18186/75

[51] Int. Cl.² ...................... B63B 39/00; G01P 15/08
[52] U.S. Cl. ..................................... 114/122; 73/503; 73/510; 73/517 A; 73/517 B; 114/125; 114/126
[58] Field of Search ............ 73/71.4, 505, 510, 517 B, 73/1 E, 503, 517 A; 114/122, 125, 126; 180/103, 104; 244/177–179, 191; 318/585, 588, 648, 651, 489; 324/162; 340/262

[56] References Cited

U.S. PATENT DOCUMENTS

| B 385,210 | 1/1975 | Johnson | 73/517 B X |
|---|---|---|---|
| 2,365,218 | 12/1944 | Rogers | 73/71.4 |
| 3,604,386 | 9/1971 | Turci | 114/125 |
| 3,734,432 | 5/1973 | Low | 244/178 X |
| 3,738,304 | 6/1973 | Duberley | 114/126 |
| 3,847,348 | 11/1974 | Russ | 114/122 X |

Primary Examiner—Stephen G. Kunin

[57] ABSTRACT

An angular accelerometer incorporates two tilt sensors both connected to a differential amplifier arranged to provide a difference signal which is fed to a first integrator the output of which is fed to a second integrator. The tilt sensors are of the torque balance type. The tilt sensors are spaced from one another in a direction transverse to the direction along which the angular acceleration movement takes place.

2 Claims, 2 Drawing Figures

ACCELERATION MEASURING DEVICE

This invention relates to accelerometers and particularly to accelerometers for measuring angular acceleration.

In situations where a moving body is subjected to a force tending to move the body from a desired position of rest it is often required that stabilizing apparatus be fitted to the body with the intention of sensing the disturbing force and applying a counterforce to maintain the body as close to the desired rest position as possible. Such a situation obtains aboard ship where wave and wind motions tend to cause the ship to move away from the equilibrium position. While ships and also aircraft and certain other vehicles may be subjected to several different forms of movement the most objectionable from the point of view of passenger comfort in passenger ships and fighting efficiency in warships is usually the motion of rolling. So that the force opposing roll may be generated in time to counteract to an extent sufficient to remove or reduce appreciably the objectionable aspects of such motion it is essential that the commencement of a rolling movement should be sensed and an assessment made of the future severity of the movement so that the appropriate counterforce may be applied as near the commencement of the movement as possible. The parameter which provides the basic information is the parameter of angular acceleration. From this parameter it is possible to obtain the values of the roll angle and the roll velocity.

Accelerometers for measuring angular acceleration are already known, but the direct measurement of low magnitude angular acceleration such as is encountered in ship rolling movement requires a complicated and rather bulky piece of apparatus.

Angular acceleration is a quadratic function and thus any error in detecting the true value of the acceleration appears in the output signal of the known types of angular accelerometer with a magnitude which is the square of the original error. Thus for an error in the output signal of acceptable magnitude the error in detection can be only the square root of the error in the output signal. Since the most common source of error in acceleration detection by angular accelerometers results from the working tolerances which must be allowed in the process of manufacture of the accelerometers such tolerances must be kept to an extremely small limit so that the square of the errors resulting from the tolerances will be acceptable. Such small tolerances cause angular accelerometers of sufficient sensitivity to be extremely expensive to manufacture and particularly prone to development of faults in operation. It would be a considerable advance in the art if an angular accelerometer were available which did not use any signals which varied quadratically and it is an object of the present invention to provide such an angular accelerometer.

The present invention makes use of a device known as a tilt sensor of the torque-balance type. Such a tilt sensor incorporates a movable mass which becomes displaced when the device is tilted and operates by generating an opposing and restoring torque to balance the torque generated by the displacement of the mass when the tilt sensor is tilted and reduces the displacement of the mass to zero, the magnitude of such balancing and restoring torque being a measure of the angle of inclination. The various torques are magnetic torques electrically generated. However, since the mass has inertia an acceleration of the sensor in addition to tilting movement will cause an additional displacement of the mass which is a result of the acceleration only thus providing a signal which has a tilt component and an acceleration component. Because of this a tilt sensor of the torque-balance type may be considered as a form of linear accelerometer although this is strictly speaking an incorrect designation of the device. In the specification the device described above although operating as a linear accelerometer will be referred to by its correct name of tilt sensor.

An angular accelerometer according to the invention incorporates means for detecting angular acceleration and providing an output signal containing details of the angular acceleration which is fed as an input signal to a first integrator which is operable to integrate the output signal from the means for detecting angular acceleration whereby to provide an output signal related to instantaneous velocity which is fed to a second integrator which is operable to integrate the signal from the first integrator whereby to provide an output signal related to the angle of swing and is characterized in that two tilt sensors of the torque-balance type both capable of providing output signals and both orientated in the direction to be sensitive to accelerations occurring in the direction along which the angular acceleration movement to be measured takes place and spaced from one another in a direction transverse to the direction along which the angular acceleration movement takes place are connected to a differential amplifier capable of comparing the two input signals from the tilt sensors and providing an output difference signal which is fed to the first integrator as the input signal thereto.

The outputs of the differential amplifier, of the first integrator, and of the second integrator may be additionally connected to a control mechanism including a servo-mechanism coupled to a ship's stabilizing apparatus and arranged to control the stabilizing apparatus so that said stabilizing apparatus operates in conformity with the information contained in the output signals from the differential amplifier, the first integrator and the second integrator.

The ship's stabilizing apparatus may incorporate stabilizing fins projecting from the sides of a ship and hydraulic pumps and motors connected to the fins, the control mechanism being operatively connected to the hydraulic pumps.

Alternatively, the stabilizing apparatus may incorporate at least one stabilizing tank arranged to contain liquid and at least one pump associated with the tank to control the movement of liquid in the tank, the control mechanism being operatively coupled to the pump.

In marine applications it is found that the roll periods mostly encountered lie in the range 5 – 30 seconds and the total acceptable roll angle must not exceed 3° for comfort. A transverse separation of 3 meters between the linear accelerometers has been found to be sufficient to provide sensitivity capable of providing action of the stabilizing mechanism fast enough to limit the angle of roll to as little as 3°. Under these conditions the acceleration to be sensed is less than 0.1 g and this low acceleration is found to be completely within the capability of the accelerometer according to the invention.

Figure 2:
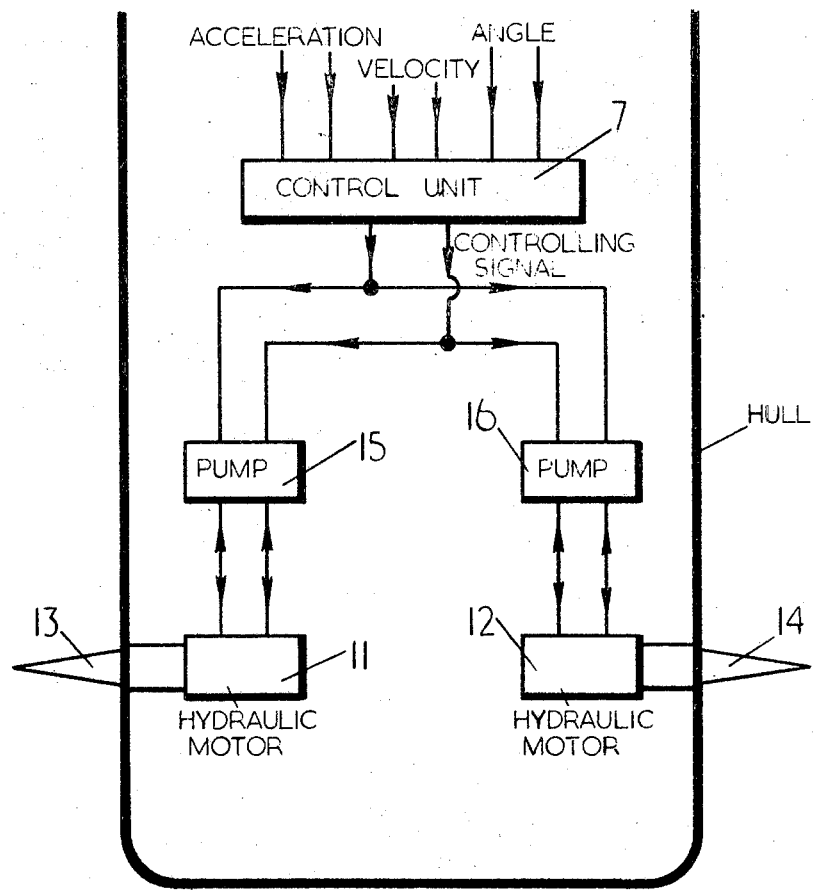

A practical embodiment of the invention is illustrated diagrammatically in the accompanying drawings in which FIG. 1 shows an angular accelerometer alone and FIG. 2 shows how the output of the accelerometer is applied to the stabilization apparatus of a ship having fin stabilizers.

In the drawings FIGS. 1 and 2 denote respectively tilt sensors of the torque-balance type spaced from one another in a direction transverse to the direction along which the acceleration movement for which compensation is to be made takes place. In the illustration they are shown attached to a bar 3 but of course it will be understood that the bar 3 may be constituted by a frame member of the ship's hull or a bulkhead. 4 denotes a differential amplifier to which the outputs of the tilt sensors are connected, said differential amplifiers being of a known type capable of comparing the two inputs and producing an amplified output signal which is the algebraic difference of the two signals. 5 denotes a first integrator to which the output of the differential amplifier 4 is connected as the input of the first integrator and 6 denotes a second integrator to which the output of the first integrator is connected as the input of the second integrator. 7 denotes a control unit which is connected by an electrical connection 8 to the output of the differential amplifier 4, by a connection 9 to the output of the first integrator 5, and by a connection 10 to the output of the second integrator 6. The connection 8 carries the signal directly from the differential amplifier 4 and it is thus a signal of angular acceleration. It will be readily understood that when the signal from the differential amplifier 4 is integrated for the first time the output is a signal representing the first integral of acceleration which is velocity and thus the connection 9 carries a velocity signal. It will also be understood that when the signal from the differential amplifier 4 is integrated twice the double integral represents angle of movement and the connection 10 carries an angle signal. These three signals are combined by the control unit to produce a control signal containing information relating to angular acceleration, velocity and angle of movement. In the stabilizing installation 11 and 12 denote hydraulic motors connected to respective stabilizing fins 13 and 14. The motor 11 is fed by a pump 15 and the motor 12 is fed by a pump 16. The output from the control unit 7 is fed to the control mechanisms of the pumps 15 and 16 so that according to the information contained in the control signal from the control unit the pumps are operated according to the roll acceleration of the ship, the instantaneous velocity of the movement and the angle of swing, the pumps providing outputs to the respective motors to adjust the fins 13 and 14 to provide compensating action.

In practice and referring to the drawings the two tilt sensors 1 and 2 are differentially affected under rolling conditions because their different distances from the axis of roll cause them to show different linear accelerations. The reason for this is that although the movement of the two sensors takes place in the same interval of time the one at the greater distance from the axis of roll moves through a greater distance in the given time that the other one and thus undergoes a high linear acceleration. The sensors also sense their angle of tilt, but because the tilt components of the two sensors is the same, since both sensors are tilted through the same angle, and since any other accelerations such as those resulting from yaw and pitch affect both sensors to the same extent the algebraic difference between the signals from the two sensors represents the difference in the linear accelerations of the two sensors. Since their distance apart is constant and known the angular acceleration of the rolling ship can be computed.

The problem would be simplified if one sensor could be placed on the swinging axis because then its output would be purely a tilt signal. On a ship, however, this is impossible because the position of the swinging axis varies according to the loading and trim of the ship among other variables.

The signals from the two tilt sensors are amplified in the differential amplifier 4 and combined to provide an output difference signal proportional to the angular acceleration. The first integration of the angular acceleration signal in the first integrator 5 provides a signal proportional to the instantaneous roll velocity and the second integration in the second integrator 6 provides a signal proportional to the roll angle. These three signals applied to the control mechanism 7 causes the control mechanism 7 to control the pumps 15 and 16 in known manner to operate the stabilizing apparatus 11, 12, 13, 14 so that the correcting action taken is appropriate to the conditions of roll. The angular acceleration of the ship is required so that an appropriate magnitude of opposing force can be determined, the instantaneous velocity of movement and the angle of roll of the ship are required so that the duration of the correcting effort can be determined.

Reference has been made above to the need for extreme precision necessary in the manufacture of known angular accelerometers to provide acceptable results because of the quadratic nature of their output signals. In further describing the operation of the present invention it may be explained that the voltage output of a tilt sensor as used in the angular accelerometer of the invention is directly proportional to the sine of the angle of tilt. This is well known. Since for the small angles of tilt, maximum about 3°, encountered during operation of the device which is the subject of the invention the sine of the angle may be taken as equal to the angle itself the voltage output of the sensor is thus directly proportional to the angle of tilt and thus directly proportional to the acceleration when the device is being used as an accelerometer. The output of the sensor, although an acceleration signal, is thus linear with respect to the acceleration sensed. The great advantage of this characteristic of the angular accelerometer of the invention will be appreciated when it is remembered that the quadratic output of a known angular accelerometer has the result that any errors in the detected acceleration resulting from necessarily present manufacturing tolerances are squared at the output. In other words if a signal produced by the device of the invention contained an error which was only just acceptable and which resulted from the presence in one part of a maximum manufacturing tolerance of 0.01 mm, the corresponding device having a quadratic output would require to have the maximum tolerance on the equivalent part limited to 0.0001 mm to provide a signal containing an error of the same magnitude.

What is claimed is:

1. An angular accelerometer for detecting the angular acceleration of an object about a rotational axis thereof comprising first and second tilt sensors of the torque-balance type oriented in the same direction to be sensitive to accelerations occurring in the direction in which the object rotates, said first and second tilt sensors being spaced from each other in a direction transverse to the direction of rotation of the body and at different distances from the axis of rotation of the object, each of said tilt sensors being capable of providing an output signal containing a component representative of the angular acceleration of the body, a differential amplifier connected to said first and second tilt sensors to receive as inputs thereto the outputs of said tilt sensors and to derive a difference output signal therefrom, a first integrator connected to said differential amplifier so as to be operable to integrate the output signal therefrom to provide an output signal related to instantaneous velocity of the rotating object, and a second integrator connected to said first integrator to receive the output signal therefrom and to be operable to integrate the output signal from said first integrator to provide an output signal related to the angle of swing of the rotating object.

2. An angular accelerometer as claimed in claim 1 including a control mechanism to which the outputs of the differential amplifier, of the first integrator, and of the second integrator are additionally connected, said control mechanism including a servo-mechanism coupled to a ship's stabilizing apparatus and arranged to control the stabilizing apparatus so that said stabilizing apparatus operates in conformity with the information contained in the output signals from the differential amplifier, the first integrator and the second integrator.

* * * * *